(12) United States Patent
Yasui et al.

(10) Patent No.: US 9,752,634 B2
(45) Date of Patent: Sep. 5, 2017

(54) ELECTRIC VEHICLE BRAKING DEVICE

(71) Applicant: ADVICS CO., LTD., Kariya, Aichi-pref. (JP)

(72) Inventors: Yoshiyuki Yasui, Nagoya (JP); Shinichiro Yukoku, Seto (JP); Satoshi Hirata, Kariya (JP); Yasukuni Ojima, Kariya (JP); Eiichiro Iwase, Kariya (JP)

(73) Assignee: ADVICS CO., LTD., Kariya, Aichi-Pref. (JP)

( * ) Notice: Subject to any disclaimer, the term of this patent is extended or adjusted under 35 U.S.C. 154(b) by 0 days.

(21) Appl. No.: 14/646,244

(22) PCT Filed: Nov. 21, 2013

(86) PCT No.: PCT/JP2013/081423
§ 371 (c)(1),
(2) Date: May 20, 2015

(87) PCT Pub. No.: WO2014/080992
PCT Pub. Date: May 30, 2014

(65) Prior Publication Data
US 2015/0300433 A1   Oct. 22, 2015

(30) Foreign Application Priority Data

Nov. 21, 2012   (JP) .................................. 2012-255214
Nov. 21, 2012   (JP) .................................. 2012-255215

(51) Int. Cl.
*F16D 65/14*   (2006.01)
*F16D 65/18*   (2006.01)
(Continued)

(52) U.S. Cl.
CPC ............ *F16D 65/18* (2013.01); *B60T 13/741* (2013.01); *F16D 2121/24* (2013.01); *F16D 2125/40* (2013.01)

(58) Field of Classification Search
CPC .............. F16D 65/18; F16D 2066/005; F16D 2121/24; F16D 2125/40; B60T 13/741
See application file for complete search history.

(56) References Cited

U.S. PATENT DOCUMENTS 2,949,171 A * 8/1960 Kissinger ................ F16D 51/20
                                                188/106 A
4,306,635 A * 12/1981 Mitchell ................. F16D 65/18
                                                188/370
(Continued)

FOREIGN PATENT DOCUMENTS

DE   10 2011 005 517 A1   9/2012
JP     2006-194709 A       7/2006
(Continued)

OTHER PUBLICATIONS

International Search Report (PCT/ISA/210) mailed on Feb. 10, 2014, by the Japanese Patent Office as the International Searching Authority for International Application No. PCT/JP2013/081423.

*Primary Examiner* — Bradley King
*Assistant Examiner* — Stephen Bowes
(74) *Attorney, Agent, or Firm* — Buchanan Ingersoll & Rooney PC

(57) ABSTRACT

The electric braking device is provided with: a pressing member, which has a thread portion with either an internal thread or an external thread and which applies a pressing force on a frictional member; a shaft member, which is rotated by an electric motor and is threadedly engaged with the thread portion; a first spherical surface member, which is separated from the shaft member, being capable of rotating relative to the shaft member around the axis of rotation of the shaft member, and the end surface of which is a spherical surface; and a second spherical surface member, which is in sliding contact with the spherical surface of the first spherical surface member, receives the reaction force of the pressing force, and is restrained from rotating with respect to the axis of rotation of the shaft member.

7 Claims, 5 Drawing Sheets

(51) Int. Cl.
*B60T 13/74* (2006.01)
*F16D 121/24* (2012.01)
*F16D 125/40* (2012.01)

(56) References Cited

U.S. PATENT DOCUMENTS

| | | | | |
|---|---|---|---|---|
| 4,784,244 A * | 11/1988 | Carre | ............... | B60T 13/741 |
| | | | | 188/156 |
| 4,850,457 A * | 7/1989 | Taig | ............... | B60T 13/741 |
| | | | | 188/156 |
| 6,213,256 B1 * | 4/2001 | Schaffer | ............... | B60T 13/741 |
| | | | | 188/156 |
| 6,932,197 B2 * | 8/2005 | Lumpkin | ............... | B60T 11/046 |
| | | | | 188/206 R |
| 7,273,134 B2 * | 9/2007 | Schack | ............... | F16D 55/226 |
| | | | | 188/1.11 R |
| 2005/0140205 A1 * | 6/2005 | Ante | ............... | B60T 17/221 |
| | | | | 303/20 |
| 2005/0167211 A1 * | 8/2005 | Hageman | ............... | F16D 65/18 |
| | | | | 188/71.9 |
| 2013/0105254 A1 | 5/2013 | Isono | | |
| 2013/0292215 A1 * | 11/2013 | Eguchi | ............... | F16H 25/2266 |
| | | | | 188/72.1 |

FOREIGN PATENT DOCUMENTS

| | | |
|---|---|---|
| JP | 2011-214647 A | 10/2011 |
| JP | 2012-002315 A | 1/2012 |
| JP | 2012-002316 A | 1/2012 |
| JP | 2012-149747 A | 8/2012 |
| WO | WO 2011/155074 A1 | 12/2011 |

* cited by examiner

ELECTRIC VEHICLE BRAKING DEVICE

TECHNICAL FIELD

The present invention relates to an electric vehicle braking device that drives an electric motor at braking of a vehicle and applying a braking force to a wheel.

BACKGROUND ART

For example, an electric vehicle braking device described in Patent Document 1 transmits a rotating force of an electric motor (power element) to a shaft member (spindle) via a reduction gear (gear unit), and allows a pressing member (brake piston) threadedly engaged with a shaft member to travel straight. Then, the pressing member presses a frictional member (brake pad) to generate a frictional force between the frictional member and a rotational member (brake disc), thereby generating a braking force on the wheel. In the electric braking device, the reduction gear is acoustically separated from the electric motor, which enables reduction of an electric-mechanic actuator in size and weight.

In an electric vehicle braking device described in Patent Document 2, a spherical surface member is interposed between a nut threadedly engaged with the shaft member and the pressing member. Contact surfaces of the spherical surface member and the pressing member are spherical surfaces, and grease is filled between the contact surfaces. A rotating force of an electric motor is transmitted to the shaft member via a reduction gear, and causes the spherical surface member and the pressing member to travel straight via the nut threadedly engaged with the shaft member. The pressing member presses the frictional member to generate a frictional force between the frictional member and a rotational member, thereby generating a braking force on a wheel. To release the braking force on the wheel, the electric motor is reversely rotated to put the spherical surface member into a free state, forming a gap between the contact surfaces of the spherical surface member and the pressing member.

The electric vehicle braking device described in Patent Document 2 transmits a rotating force of the electric motor to the shaft member via the reduction gear, and causes the spherical surface member and the pressing member to travel straight via the nut threadedly engaged with the shaft member. Then, the pressing member presses the frictional member to generate a frictional force between the frictional member and the rotational member, generating a braking force on the wheel. To release the braking force on the wheel, the electric motor is reversely rotated to put the spherical surface member into a free state and to form a gap between the contact surfaces of the spherical surface member and the pressing member. The electric braking device is provided with a load sensor for sensing the pressing force of the pressing member. The electric motor is controlled according to a detection signal of the load sensor.

Patent Document 3 describes a load sensor in which a sphere member is supported in a hole at the center of a deformable base, and four strain detection elements are formed around the sphere member. In the load sensor, when a load is applied to the sphere member in an inclined direction, the load is distributed by the sphere member and acts on the base. Thus, even if a load input direction is deviated, the load never acts on the base intensively, being reliably detected. The load sensor is used, for example, to detect a load applied to the frictional member in the brake-by-wire system.

PRIOR ART DOCUMENTS

Patent Documents

Patent Document 1: DE102011005517
Patent Document 2: JP2012-002316A
Patent Document 3: JP2006-194709A

SUMMARY OF THE INVENTION

Problems to be Solved by the Invention

In the electric vehicle braking device described in Patent Document 1, a contact surface of a plate that contacts with the shaft member is spherical like a universal ball joint. The plate (spherical surface member) is supported by a thrust bearing, and rotates with the rotational motion of the shaft member that transmits power of the electric motor to the pressing member. Thus, when uneven wear of the frictional member increases to cause axis (angular) deviation of the shaft member, at rotation of the shaft member, sliding movement (sliding) occurs on a contact surface of the spherical surface member at all times.

The relation between the axis deviation of the shaft member and the sliding movement of the spherical surface member on the contact surface will be explained below with reference to FIGS. 5(a) and 5(b). It is assumed that an end of a shaft member SPD is formed to be a spherical surface, and a sphere member BJT is fixed to a front end of the SPD. The sphere member BJT is in slidable contact with a spherical surface member PLT. Without uneven wear of the frictional member to cause the axis deviation of the shaft member SPD, the shaft member SPD, the sphere member BJT, and the spherical surface member PLT coaxially rotate about an axis of rotation ktj.

When uneven wear of the frictional member occurs, in the state where the electric motor is stopped, the axis of rotation of the shaft member SPD deviates from the axis of rotation (original axis of rotation) ktj of the spherical surface member PLT (angular axis deviation). That is, as illustrated in FIG. 5(a), a dotted line passing through a point A of the spherical surface member PLT forms an inclination angle $\theta 1$ with the shaft member SPD. Next, as illustrated in FIG. 5(b), when the electric motor starts to rotate, and the spherical surface member PLT rotates about the axis of rotation ktj by 180 degrees, the dotted line passing through the point A forms an inclination angle $\theta 2$ with the shaft member SPD.

Because the axis deviation of the shaft member SPD occurs due to uneven wear of the frictional member and the like, the direction of the axis deviation (the direction of the shaft member SPD with respect to the axis of rotation ktj) is constant (is fixed and remains unchanged) at all times. For this reason, the relative position between the sphere member BJT and the spherical surface member PLT changes with the rotation of the spherical surface member PLT every moment. Thus, while the output shaft of the electric motor rotates, sliding movement (sliding) always occurs between contact surfaces of the sphere member BJT and the spherical surface member PLT. Although the contact surfaces are lubricated with grease or the like, the grease between the contact surfaces may be run off due to repeated sliding movement.

Further, with this configuration, because the above-mentioned sliding movement (sliding) occurs in a power transmission path, the transmission efficiency becomes lower. Further, at transmission of power from the electric motor, the sphere member BJT and the spherical surface member PLT need to be rotated and therefore, the rotational motion consumes the output of the electric motor. At sudden braking, the responsiveness of a braking torque (that is, the responsiveness of the electric motor at the time when the electric motor rapidly increases its rotational speed from its stopped state) needs to be ensured. From this viewpoint as well, reduction of the members that perform the rotational motion is desired.

On the other hand, in the electric vehicle braking device described in Patent Document 2, the spherical surface member and the pressing member can swing on their spherical surfaces, which allow oscillating motion (swinging motion) of the shaft member and the pressing member. Thus, even when axis deviation of the pressing member (corresponding to the above-mentioned axis deviation of the shaft member) occurs, the axis deviation can be absorbed. However, comparing with a conventional hydraulic braking device (for example, hydraulic brake caliper) it is required to add new components such as an electric motor and a power transmission mechanism, and accordingly downsizing of each component is strongly desired.

The electric vehicle braking device described in Patent Document 2, comparing with the conventional hydraulic braking device (for example, hydraulic brake caliper), requires to add new components such as an electric motor, a reduction gear, and a pressing force acquisition device, and therefor downsizing of each constituent is strongly desired.

The present invention is devised in consideration of the above-mentioned situation, and the object of the invention is to provide a compact electric vehicle braking device capable of ensuring a good lubricating state of a spherical surface member, thereby maintaining the smooth swinging motion of a pressing member and so on, and improving responsiveness at sudden braking, and besides to provide a compact electric vehicle braking device capable of detecting a pressing force applied to a frictional member, and controlling an electric motor based on a detection result.

Solutions to the Problems

The electric vehicle braking device according to a first aspect of the invention to solve the problems above is characterized in that the electric vehicle braking device that presses a frictional member (MSB) onto a rotational member (KTB) fixed to a wheel (WHL) of a vehicle by means of an electric motor (MTR) to generate a braking torque on the wheel (WHL) comprises: a pressing member (PSN) that has a thread portion (NJB), which is either a nut-corresponding portion or a bolt-corresponding portion, and applies a pressing force (Fba) to the frictional member (MSB); a shaft member (SFT) that is rotated by the electric motor (MTR) and is threadedly engaged with the thread portion (NJB); a first spherical surface member (QM1) that is separated from the shaft member (SFT) and relatively rotatable around an axis of rotation (sfj) of the shaft member (SFT) with respect to the shaft member (SFT), and has a spherical surface (KJM1); and a second spherical surface member (QM2) that is in sliding contact with the spherical surface (KJM1) of the first spherical surface member (QM1), and receives a reaction force (reaction) of the pressing force (Fba), being restrained from being rotated around the axis of rotation (sfj) of the shaft member (SFT).

In this specification, the "nut-corresponding portion" refers to "a part corresponding to a nut, and the "bolt-corresponding portion" refers to "a part corresponding to a bolt". For example, in the case where the thread portion (NJB) uses slide transmission, the "nut-corresponding portion" is a "female thread portion (which may be also referred to as an internal thread portion)", and the "bolt-corresponding portion" is a "male thread portion (which may be also referred to as an external thread portion)". In the case where the thread portion (NJB) uses rolling transmission utilizing balls, the "nut-corresponding portion" is a "nut with ball groove (which may be also referred to as a nut)", and the "bolt-corresponding portion" is a "shaft with ball groove (which may be also referred to as a threaded shaft)".

The invention according to a second aspect of the invention is characterized in that in the electric vehicle braking device according to the first aspect of the invention, the shaft member (SFT) abuts on the first spherical surface member (QM1) via a bearing (BRG) interposed therebetween.

The invention according to a third aspect of the invention is characterized in that the electric vehicle braking device according to the first or second aspect of the invention further includes a restraint member (KSB) fixed to the second spherical surface member (QM2), which restricts the motion of the first spherical surface member (QM1) along the axis (sfj) of the shaft member.

The electric vehicle braking device according to a forth aspect of the invention to solve the problems above is characterized in that an electric vehicle braking device that presses a frictional member (MSB) onto a rotational member (KTB) fixed to a wheel (WHL) of a vehicle by means of an electric motor (MTR) to generate a braking torque on the wheel (WHL) comprises: a pressing member (PSN) that has a thread portion (NJB), which is either a nut-corresponding portion or a bolt-corresponding portion, and applies a pressing force (Fba) to the frictional member (MSB); a shaft member (SFT) that is rotated by the electric motor (MTR) and is threadedly engaged with the thread portion (NJB); a first spherical surface member (QM1) that receives a reaction force of the pressing force (Fba) from either the pressing member (PSN) or the shaft member (SFT), and has a spherical surface (KJM1); a second spherical surface member (QM2) that is restrained from being rotated around an axis of rotation (sfj) of the shaft member (SFT), and is in sliding contact with the spherical surface (KJM1) of the first spherical surface member (QM1), receiving the reaction force of the pressing force (Fba) from the first spherical surface member (QM1); an acquisition device (FBA) that detects a strain (Hzm) of the second spherical surface member (QM2) to acquire the pressing force (Fba) on the basis of the strain (Hzm); and a control portion (CTL) that controls the electric motor on the basis of the pressing force (Fba).

The invention according to a fifth aspect of the invention is characterized in that in the electric vehicle braking device according to the fourth aspect of the invention further includes an element (HZM) for detecting the strain (Hzm), which is adhered to the second spherical surface member (QM2) on the surface (HM2) opposite side to the spherical surface (KJM1) in a direction of the axis (sfj) of the shaft member (SFT).

The invention according to a sixth aspect of the invention is characterized in that the electric vehicle braking device according to the fourth or fifth aspect of the invention further includes a restraint member (KSB) fixed to the second spherical surface member (QM2) which restricts relative motion between the first spherical surface member (QM1) and the second spherical surface member (QM2) along the axis (sfj) of the shaft member.

The invention according to a seventh aspect of the invention is characterized in that in the electric vehicle braking device according to any one of the first to sixth aspects of the invention, the first spherical surface member (QM1) has a convex spherical surface (KJM1) as the spherical surface, and the second spherical surface member (QM2) has a concave spherical surface (KJM2) that is in sliding contact with the convex spherical surface (KJM1).

The invention according to an eighth aspect of the invention is characterized in that in the electric vehicle braking device according to any one of the first to seventh aspects of the invention, the center of the spherical surface (KJM1, KJM2) is located on the contact surface of the rotational member (KTB) that contacts with the frictional member (MSB).

The invention according to a ninth aspect of the invention is characterized in that in the electric vehicle braking device according to any one of the first to eighth aspects of the invention, the first spherical surface member (QM1) and the second spherical surface member (QM2) have respective through holes (KA1, KA2) at the centers thereof, and power is transmitted from the electric motor (MTR) to the shaft member (SFT) through the through holes (KA1, KA2).

Effects of the Invention

According to the first aspect of the invention, the rotation of the second spherical surface member (QM2) around the axis of rotation (sfj) of the shaft member (SFT) is restrained. The first spherical surface member (QM1) that is in sliding contact with the second spherical surface member (QM2) is separated from the rotating shaft member (SFT) and thus, can freely rotate around the axis of rotation (sfj) of the shaft member (SFT) with respect to the shaft member (SFT). For this reason, when the shaft member (SFT) rotates, the first spherical surface member (QM1) remains stationary, or rotates only slightly. Even if the actual axis of rotation (sfj) is inclined relative to the original axis of rotation (ktj) in the shaft member (SFT) due to axis deviation of the shaft member (SFT), the first spherical surface member (QM1) does not rotate around the axis of rotation (sfj) of the shaft member or rotates only slightly. As a result, repeated sliding movement along with the rotation of the electric motor (MTR) is decreased, and accordingly the good lubricating state is maintained. Further, a decrease of the efficiency of the power transmission due to sliding movement (sliding) can be suppressed. In addition, the rotational motion of the first and second spherical surface members (QM1, QM2) is restricted or suppressed, and thereby the responsiveness of the electric motor MTR at a sudden braking is improved to obtain sure responsiveness to a rise of braking torque.

In a structure where the spherical sliding contact surfaces (contact surfaces KJM1, KJM2 of the first and second spherical surface member QM1, QM2) for absorbing axis deviation are arranged closer to the electric motor (MTR) than the thread portion (NJB) in the power transmission path, the motion in the pressing direction (direction of the axis (sfj) of the shaft member) and the motion in the rotational direction (rotational direction around the axis (sfj) of the shaft member) are applied to the first spherical surface member (QM1). According to the second aspect of the invention, as the first spherical surface member (QM1) abuts on the shaft member (SFT) via the bearing (BRG) interposed therebetween, the shaft member (SFT) can rotate smoothly. As a result, a high efficiency can be surely achieved in transmitting power from the electric motor (MTR) to the pressing member (PSN).

According to the third aspect of the invention, because the first spherical surface member (QM1) and the second spherical surface member (QM2) are restricted from moving relatively along the axis (sfj) of the shaft member (relative position between the first and second spherical surface member QM1 and QM2) by the restraint member (KSB), the posture of the first spherical surface member (QM1) in which the first spherical surface member (QM1) contacts with the second spherical surface member QM2 can be kept proper. That is, the axis of the first spherical surface member (QM1) does not incline relative to the axis of the second spherical surface member (QM2) more than necessary. This can prevent impairment of the swinging function (oscillating function) of the shaft member (SFT).

According to the fourth aspect of the invention, the second spherical surface member (QM2) has both the function of allowing the oscillating motion (swinging) of the pressing member (PSN) and the function of detecting the pressing force (Fba) of the pressing member (PSN) as a strain inducing body, and accordingly it becomes possible to make the whole braking device compact. Further, because the second spherical surface member (QM2) is restrained from rotating around the axis of rotation (sfj) of the shaft member (SFT) (corresponding to the pressing direction of the pressing member (PSN)), the detection signal (Hzm) of the pressing force (Fba) can be derived without requiring a slip ring or the like, which makes the whole braking device compact.

According to the fifth aspect of the invention, because the strain detection element (HZM) is provided on the back surface (HM2) of the second spherical surface member (QM2), pull-out and wiring of a detection signal line (LDS) from the strain detection element (HZM) to a calculation processing unit (ENZ) can be facilitated.

According to the sixth aspect of the invention, because the first spherical surface member (QM1) and the second spherical surface member (QM2) are restrained from moving relatively along the axis (sfj) of the shaft member (relative position between the first and second spherical surface member QM1 and QM2) by the restraint member (KSB), the posture of the first spherical surface member in which the first spherical surface member contacts with the strain inducing body (QM2) against the reaction force (reaction) of the pressing force (Fba) from the pressing member (PSN) can be kept proper. That is, the axis of the first spherical surface member (QM1) and the axis of the second spherical surface member (QM2) do not incline toward with each other more than necessary. This enables highly accurate detection of the pressing force (Fba) by the pressing member (PSN).

According to the seventh aspect of the invention, because the first spherical surface member (QM1) has the convex spherical surface (KJM1), and the second spherical surface member (QM2) has the concave spherical surface (KJM2), when the reaction force of the pressing force (Fba) from the pressing member (PSN) is applied to the first and second spherical surface member QM1, QM2 via shaft member (SFT), the radial component of the force acts toward the center according to the relative inclination between the spherical surfaces (KJM1, KJM2). That is, because of the self-centering effect of the spherical surfaces (KJM1, KJM2), the relative position between the first spherical surface member (QM1) and the second spherical surface member (QM2) can be kept proper. Accordingly, the axis deviation of the shaft member (SFT) can be properly absorbed.

Due to uneven wear of the frictional member (MSB), axis deviation of the shaft member (SFT) (angular deviation between the two axes) occurs from the contact area of the rotational member (KTB) contacting with the frictional member (MSB) as a base point. According to the eighth aspect of the invention, since the centers of the spherical surfaces (KJM1, KJM2) of the first and second spherical surface members (QM1, QM2) are the base point (point O), the axis deviation of the shaft member (SFT) can be efficiently absorbed.

According to the ninth aspect of the invention, the through hole (KA1) is provided at the center of the first spherical surface member (QM1), and the through hole (KA2) is provided at the center of the second spherical surface member (QM2). Power (torque) is transmitted from the electric motor (MTR) to the shaft member (SFT) through the two through holes (KA1, KA2). For example, a counter shaft may be separately provided, and the rotational motion of the electric motor may be transmitted to the shaft member via the counter shaft. As compared to such configuration, the structure according to the invention becomes simpler, and the entire device becomes compact.

EMBODIMENT OF THE INVENTION

Overall Structure of Electric Vehicle Braking Device

Figure 1:
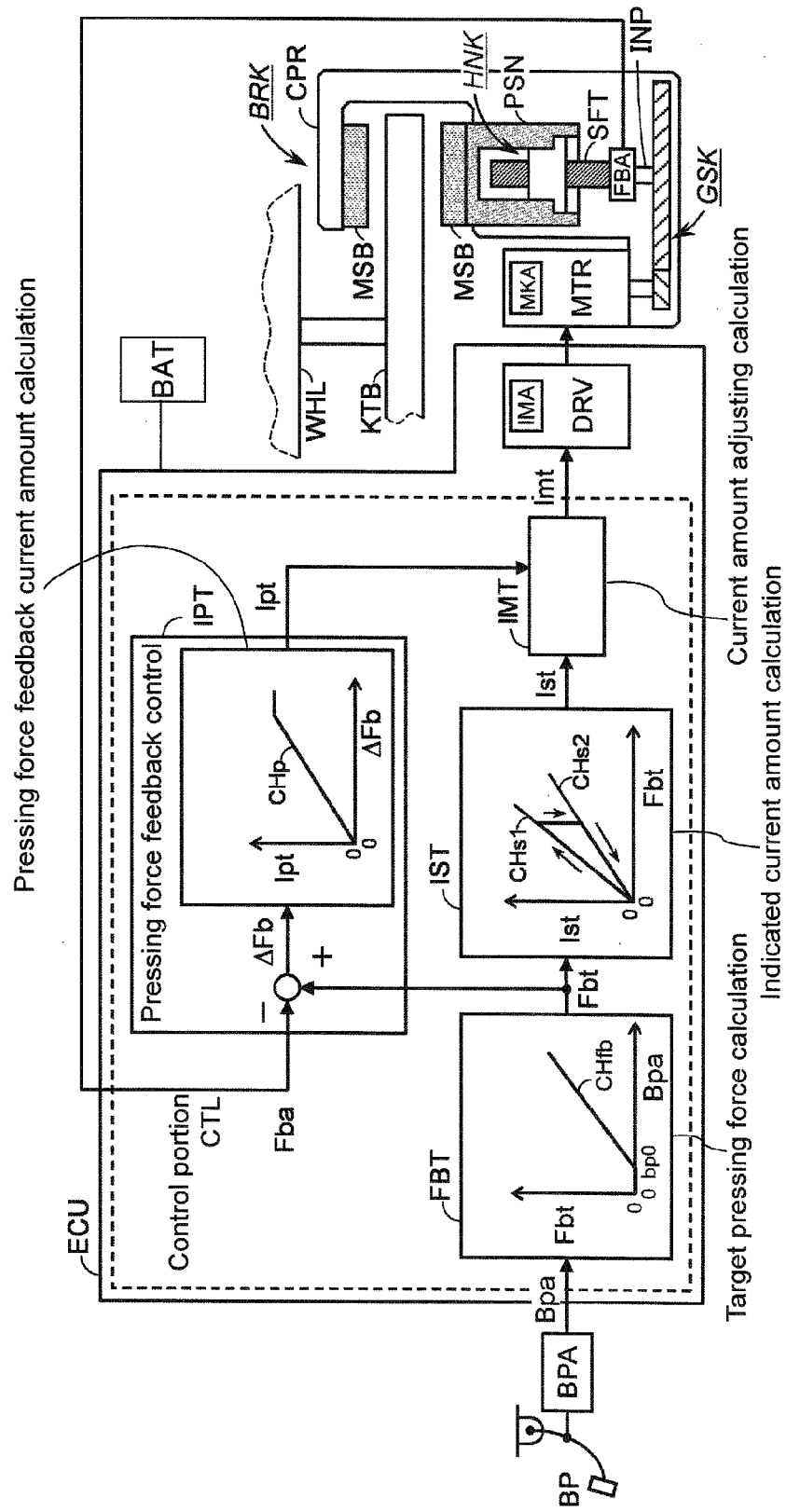
FIG. 1 is a view illustrating overall structure of an electric vehicle braking device in accordance with an embodiment of the present invention.

The overall structure of an electric vehicle braking device in accordance with an embodiment of the present invention will be described below with reference to FIG. 1. As shown in FIG. 1, the electric vehicle braking device includes a brake operating member (for example, brake pedal) BP operated by the driver to decelerate a vehicle, an electric braking device (electric brake actuator) BRK that adjusts braking torque to each wheel WHL to generate braking force on each wheel WHL, an electronic control unit ECU that controls the electric braking device BRK, and a storage battery BAT as a power source that supplies electric power to the electronic control unit ECU and so on. A control portion (control algorithm) CTL that controls the electric braking device BRK is programmed in the electronic control unit ECU.

The vehicle is equipped with an operating amount acquisition device BPA that detects an operating amount (brake operating amount) Bpa of the brake operating member BP.

For example, the operating amount acquisition device BPA is at least one of a sensor (pressure sensor) that detects pressure in a master cylinder (not shown) and a sensor that detects operating force and/or displacement of the brake operating member BP (pedal stepping force sensor, stroke sensor). Accordingly, the brake operating amount Bpa is calculated based on at least one of a master cylinder pressure, a brake pedal stepping force, and a brake pedal stroke.

[Electric Braking Device BRK]

The electric braking device BRK includes a floating-type brake caliper CPR, a rotational member KTB, a frictional member MSB, an electric motor MTR, a motor driving circuit DRV, a reduction gear GSK, a rotation-linear motion converting mechanism HNK, an current amount acquisition device IMA, a position acquisition device MKA, and a pressing force acquisition device FBA.

For example, the rotational member KTB is a brake disc, the frictional member MSB is a brake pad, and the electric motor MTR is a brush motor or a brushless motor.

The reduction gear GSK reduces a rotational output (torque) of the electric motor MTR, and transmits the torque to the rotation-linear motion converting mechanism HNK. The reduction gear GSK is at least one of a gear transmission mechanism (spur gear, helical gear, etc.), a wrapping transmission mechanism (belt, chain, etc.), and a friction transmission mechanism. An output member of the reduction gear GSK becomes an input member INP of the rotation-linear motion converting mechanism HNK to input (transmit) power of the electric motor MTR from the reduction gear GSK to the rotation-linear motion converting mechanism HNK.

The rotation-linear motion converting mechanism HNK is a mechanism that converts rotation into linear motion, and includes a shaft member SFT and a pressing member (for example, brake piston) PSN. The shaft member SFT and the pressing member PSN have respective thread portion NJB threadedly engaging with each other. That is, the shaft member SFT having the thread portion ONJ is rotated with the input member INP, and the pressing member PSN having the thread portion MNJ threadedly engaged with the thread portion ONJ advances or retreats with respect to the rotational member KTB (for example, brake disc). Then, the frictional member (for example, brake pad) MSB is pressed by the pressing member PSN, thereby being pressed onto the rotational member KTB. For example, the thread portion NJB of the rotation-linear motion converting mechanism HNK is formed of a sliding screw device (ex. trapezoidal screw) that transmits power by means of "sliding". In this case, "a thread portion of a nut-corresponding portion" corresponds to a "female screw (also referred to as internal screw)", and "a thread portion of a bolt-corresponding portion" corresponds to a "male screw (external screw)". A ball screw device (ex. ball screw) that transmits power by means of "rolling" can be also used as the thread portion NJB of the rotation-linear motion converting mechanism HNK. In this case, "the thread portion of the nut-corresponding portion" corresponds to "a ball groove of a nut", and "the thread portion of the bolt-corresponding portion" corresponds to "a ball groove of a screw shaft (threadedly engaged with the nut via interposed balls therebetween.

The motor driving circuit DRV controls a current amount (finally, a current value) supplied to the electric motor MTR on the basis of a target current amount (target value) Imt indicated from the control portion CTL. Specifically, the control portion CTL is provided with the motor driving circuit DRV formed of a bridge circuit including switching elements (power transistor such as a MOS-FET). The switching elements are driven based on the target current amount Imt to control an output (output torque) of the electric motor MTR. That is, the switching elements are switched between a conduction state and non-conduction state to adjust the rotational direction and the output torque of the electric motor MTR.

The motor driving circuit DRV is provided with the current amount acquisition device (for example, current sensor) IMA to detect an actual current amount (for example, a current actually passing through the electric motor MTR) Ima. The electric motor MTR is provided with the position acquisition device (for example, angle sensor) MKA to detect the angular position of a rotor of the electric motor MTR (for example, rotational angle) Mka. The rotation-linear motion converting mechanism HNK is provided with the pressing force acquisition device (for example, pressing force sensor) FBA to detect a force with which the frictional member MSB is actually pressed to the rotational member KTB (actual value of the pressing force) Fba.

According to the electric braking device (electric brake actuator) BRK constructed as described above, the output of the electric motor MTR is transmitted to the rotation-linear motion converting mechanism HNK through the reduction gear GSK and the input member INP. Thereby, the pressing member (brake piston) PSN advances toward the rotational member (brake disc) KTB. Then, the pressing member PSN presses the frictional member (brake pad) MSB toward the rotational member KTB to press the frictional member MSB onto the rotational member KTB. As the rotational member KTB is fixed to the wheel WHL, a frictional force is generated between the frictional member MSB and the rotational member KTB to generate a braking force on the wheel WHL.

[Control Portion CTL]

The control portion CTL includes a target pressing force calculating portion FBT, an indicated current amount calculating portion IST, a pressing force feedback control portion IPT, and a current amount adjustment calculating portion IMT. The control portion (control program) CTL is programmed in the electronic control unit ECU.

The target pressing force calculating portion FBT calculates a target pressing force Fbt for each wheel WHL on the basis of the brake operating amount Bpa by using a previously set target pressing force calculating characteristic (calculation map) CHfb. The target pressing force Fbt is a target value of the pressing force with which the frictional member (brake pad) MSB is pressed to the rotational member (brake disc) KTB in the electric braking device BRK.

The indicated current amount calculating portion IST calculates an indicated current amount Ist on the basis of the target pressing force Fbt by using previously set indicated current amount calculating characteristics (calculation maps) CHs1, CHs2. The indicated current amount Ist is a target value of the current amount supplied to the electric motor MTR in order to drive the electric motor MTR of the electric braking device BRK to obtain the target pressing force Fbt. The calculation map for the indicated current amount Ist has two characteristics CHs1, CHs2 in consideration of hysteresis of the electric braking device BRK. The characteristic CHs1 corresponds to the case of increasing the pressing force, and the characteristic CHs2 corresponds to the case of decreasing the pressing force. The characteristic CHs1 is set to output a larger indicated current amount Ist than the characteristic CHs2.

The current amount used herein is the quantity of state (variable) for controlling the output torque of the electric motor MTR. Because the electric motor MTR outputs a torque that is substantially proportional to a current, the current target value of the electric motor MTR can be used as the target value of the current amount. Further, since the current is increased as the voltage supplied to the electric motor MTR is increased, the value of supplied voltage can be used as the target value of the current amount. Moreover, since the value of supplied voltage can be adjusted by changing the duty ratio of the pulse width modulation (PWM), the duty ratio can be used as the target value of the current amount.

The pressing force feedback control portion IPT calculates a pressing force feedback current amount Ipt on the basis of the target pressing force (target value) Fbt and the actual pressing force (actual value) Fba. Although the indicated current amount Ist is calculated as a value corresponding to the target pressing force Fbt, an error (stationary error) between the target pressing force Fbt and the actual pressing force Fba may occur due to variation in the efficiency of the electric braking device BRK. The pressing force feedback current amount Ipt is calculated based on a deviation (pressing force deviation) ΔFb between the target pressing force Fbt and the actual pressing force Fba and a calculating characteristic (calculation map) CHp, and is determined to decrease the above-mentioned error. The actual pressing force Fba is acquired (detected) by the below-mentioned pressing force acquisition device FBA.

The current amount adjustment calculating portion IMT calculates the target current amount Imt that is the ultimate target value of the current amount supplied to the electric motor MTR. The indicated current amount Ist is adjusted by using the pressing force feedback current amount Ipt, and thereby the target current amount Imt is calculated. Specifically, the current amount adjustment calculating portion IMT adds the feedback current amount Ipt to the indicated current amount Ist to calculate the target current amount Imt. The target current amount Imt is the target value of the ultimate current amount for controlling the output of the electric motor MTR, and is calculated based on the detection result (Fba) of the pressing force acquisition device FBA. The rotational direction (forward direction or reverse direction) of the electric motor MTR is determined based on the positive and negative information (positive or negative value) of the target current amount Imt, and the output of the electric motor MTR is controlled based on the magnitude of the target current amount Imt.

Figure 2:
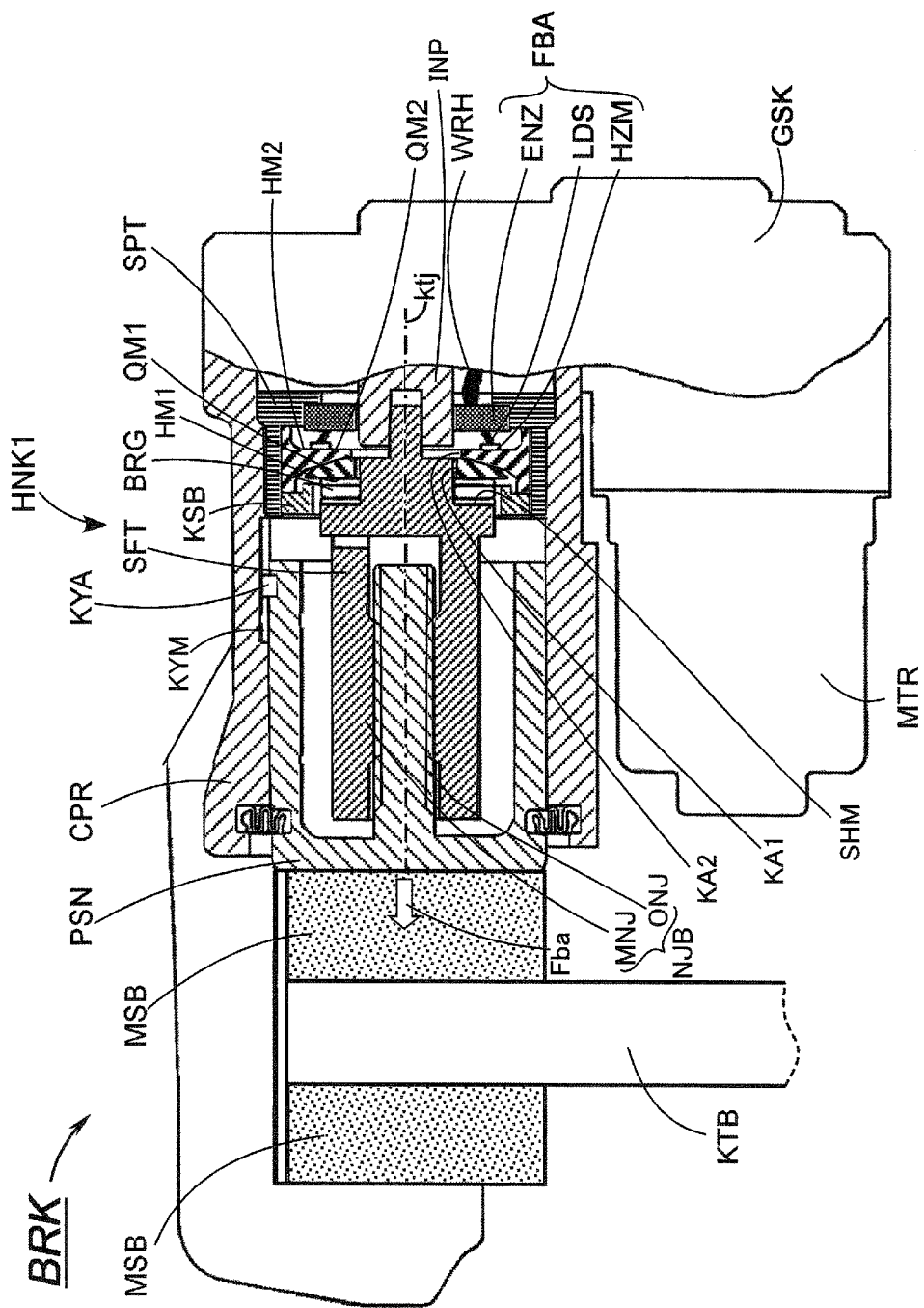
FIG. 2 is a partial sectional view illustrating a rotation-linear motion converting mechanism of the electric braking device in a first embodiment.

First Embodiment of Rotation-Linear Motion Converting Mechanism HNK of Electric Braking Device BRK First embodiment of the rotation-linear motion converting mechanism HNK of the electric braking device BRK will be explained below with reference to FIG. 2. As shown in FIG. 2, the rotation-linear motion converting mechanism HNK1 includes the pressing member PSN, the shaft member SFT, a first spherical surface member QM1, a second spherical surface member QM2, a bearing BRG, a restraint member KSB, a holding member SPT, and so on. A part of the rotation-linear motion converting mechanism HNK1 also functions as the pressing force acquisition device FBA.

The pressing member (piston) PSN presses the frictional member MSB onto the rotational member KTB to generate a frictional force. The motion of the pressing member PSN with respect to the brake caliper (floating-type caliper) CPR is limited by a key member KYA and a key groove KYM. The brake caliper CPR has a key groove KYM extending along the axis of rotation ktj (hereinafter referred to as input axis ktj) of the input member INP. The key member KYA fixed to the pressing member PSN is fitted into the key groove KYM. Thus, the rotational motion of the pressing member PSN around the input axis ktj is restricted, but the linear motion thereof along the input axis ktj (along the key groove KYM) is allowed. The input member INP is a component member that transmits (inputs) a torque output (rotational output) of the electric motor MTR, which is transmitted via the reduction gear GSK, to the shaft member SFT.

The shaft member SFT is rotated about the axis of the input member INP (around the input axis ktj) by the input member INP, and transmits the torque output (rotational output) of the electric motor MTR to the pressing member PSN. The shaft member SFT is inserted into a through hole KA1 of the first spherical surface member QM1 and a through hole KA2 of the second spherical surface member QM2. That is, the input member INP, shaft member SFT, the first spherical surface member QM1, and the second spherical surface member QM2 are arranged coaxially. When there is no axis deviation, an axis of rotation sfj of the shaft member SFT (hereinafter referred to as shaft axis sfj) coincides with an axis of rotation of the input member INP (input axis ktj). However, swinging (oscillation) of the shaft member SFT is caused by bending of the brake caliper (floating caliper) CPR or uneven wear of the frictional member MSB, generating the axis deviation (angular deviation) of the two axes (ktj and sfj). The first spherical surface member QM1 and the second spherical surface member QM2 absorb the axis deviation (for example, angular variation) to transmit the rotating force smoothly. In other words, the first spherical surface member QM1 and the second spherical surface member QM2 form a pair to function as an adjustable joint (universal joint).

The pressing member PSN is provided with a threadedly engageable male thread portion (that is also referred to as external thread portion, and corresponds to the "bolt-corresponding portion") ONJ. The shaft member SFT is provided with a female thread portion (that is also referred to as internal thread portion, and corresponds to the "nut-corresponding portion") MNJ engaged with the male thread portion ONJ. In the thread portion NJB where the female thread portion MNJ of the shaft member SFT is threadedly engaged with the male thread portion ONJ of the pressing member PSN, the rotational motion (torque) of the shaft member SFT is converted into the linear motion (thrust force) of the pressing member PSN.

The bearing (for example, thrust bearing) BRG is provided between a flat surface SHM of the shaft member SFT, which is located opposite to the pressing member PSN across the thread portion NJB, and a flat surface HM1 (back surface of the below-mentioned convex spherical surface KJM1) of the first spherical surface member QM1. The bearing BRG reduces friction (resistance) in the rotational direction, and smooths relative rotational motion between the shaft member SFT and the first spherical surface member QM1. The bearing BRG reduces a power loss caused by frication, ensuring highly efficient power transmission from the electric motor MTR to the pressing member PSN. The bearing BRG can be omitted, and if omitted, contact end surfaces of the shaft member SFT and the first spherical surface member QM1 (contact flat surfaces SHM and flat surface HM1) are subjected to surface treatment for reducing frication (for example, Teflon (registered trademark) coating).

The restraint member KSB is fixed to the second spherical surface member QM2, and restricts the motion of the first spherical surface member QM1 in the direction of the shaft axis sfj (lateral direction in the figure). Specifically, the restraint member KSB and the second spherical surface member QM2 have a gap (space) therebetween, and the first spherical surface member QM1 is provided in the gap. Thus, the first spherical surface member QM1 can move only in the gap between the restraint member KSB and the second spherical surface member QM2. Even if axis deviation (angular deviation) between the input axis (axis of rotation of the input member INP) ktj and the shaft axis (axis of rotation of the shaft member SFT) sfj occurs, the angle is so small that the movement amount of the first spherical surface member QM1 in the direction of the input axis ktj is equivalent to that in the direction of the shaft axis sfj.

The pressing force acquisition device FBA includes a strain detection element (for example, strain gauge) HZM, a calculation processing unit (for example, calculation circuit) ENZ, and a lead wire (detection signal wire) LDS, and detects the pressing force (reaction force of the pressing force) Fba of the pressing member PSN. The strain detection element HZM is adhered to a flat surface HM2 (back surface of a below mentioned concave spherical surface KJM2) of the second spherical surface member QM2. A strain amount (signal) Hzm detected by the strain detection element HZM is transmitted to the calculation processing unit ENZ through the lead wire LDS. The calculation processing unit ENZ calculates the pressing force Fba on the basis of the strain Hzm.

The holding member SPT holds the pressing force acquisition device FBA (especially, calculation processing unit ENZ), the second spherical surface member QM2, and the restraint member KSB. The holding member SPT is fixed to the brake caliper CPR. Accordingly, the pressing force acquisition device FBA, the second spherical surface member QM2, and the restraint member KSB are fixed to the brake caliper CPR. The holding member SPT can be omitted, and if omitted, the pressing force acquisition device FBA (especially, calculation processing unit ENZ), the second spherical surface member QM2, and the restraint member KSB are directly fixed to the brake caliper CPR.

Next, referring to FIG. 3, the first spherical surface member QM1, the second spherical surface member QM2, the restraint member KSB, and the pressing force acquisition device FBA will be explained in detail.

Figure 3:
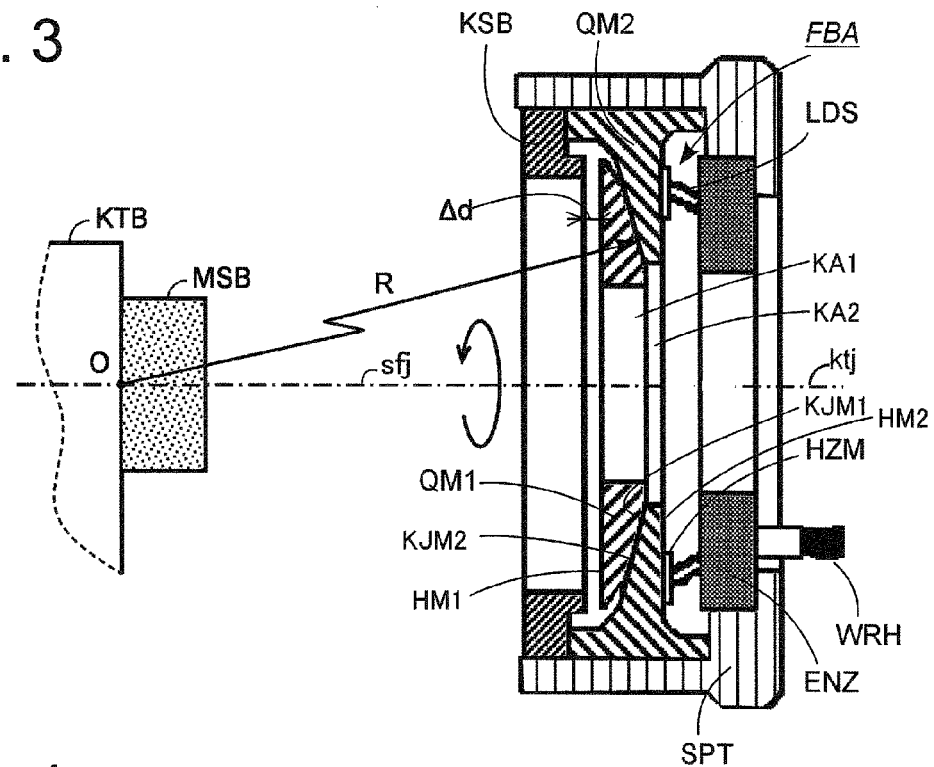
FIG. 3 is a partial sectional view illustrating a first and second spherical surface members and a pressing force acquisition device in FIG. 2.

As illustrated in FIG. 3, one disc-like end surface of the first spherical surface member QM1 is formed into a convex spherical surface (protruding spherical surface) KJM1, and the other end surface is formed into the flat surface HM1. The convex spherical surface KJM1 of the first spherical surface member QM1 slides on a concave spherical surface (recessed spherical surface) KJM2 of the second spherical surface member QM2. The first spherical surface member QM1 and the second spherical surface member QM2 slide (slip) on each other, thereby functioning as a universal joint to allow axis deviation of the shaft member SET. The flat surface HM1 of the first spherical surface member QM1 (back side surface of the convex spherical surface KJM1) receives a reaction force (reaction) of the pressing force Fba from the shaft member SFT (flat surface SHM vertical to the shaft axis sfj), and the reaction force is transmitted to the second spherical surface member QM2 via the convex spherical surface KJM1. The through hole KA1 is formed at the center of the first spherical surface member QM1, into which the shaft member SFT is inserted. The flat surface HM1 receives a reaction force (force from the PSN) of the pressing force from the flat surface SHM vertical to the axis of rotation (shaft axis sfj) of the shaft member SFT via the bearing BRG, and is in press-contact with the flat surface SHM. The flat surface SHM is a flat surface formed on the shaft member SFT, which is provided on the opposite side to the pressing member PSN across the thread portion NJB.

One disc-like end surface of the second spherical surface member QM2 is formed into the concave spherical surface KJM2, and the other end surface is formed into the flat surface HM2. The second spherical surface member QM2 is fixed to the brake caliper CPR. That is, the second spherical surface member QM2 does not rotate around the input axis ktj and the shaft axis sfj. The second spherical surface member QM2 does not move along the input axis ktj and the shaft axis sfj (linear motion). The concave spherical surface KJM2 of the second spherical surface member QM2 slides on the convex spherical surface KJM1 of the first spherical surface member QM1, and the concave spherical surface KJM2 receives the reaction force of the pressing force Fba from the first spherical surface member QM1. The strain detection element HZM is adhered to the flat surface HM2 of the second spherical surface member QM2 (back side surface of the concave spherical surface KJM2), and the HZM measures the strain (deformation due to the force) Hzm of the second spherical surface member QM2. The pressing force Fba is detected based on the strain Hzm generated by the reaction force of the pressing force. The through hole KA2 is formed at the center of the second spherical surface member QM2, into which the shaft member SFT is inserted.

The restraint member KSB is fixed to the second spherical surface member QM2, and forms a gap (space) between the restraint member KSB and the second spherical surface member QM2. The first spherical surface member QM1 is provided in the gap. The restraint member KSB restricts the motion of the first spherical surface member QM1 along the shaft axis sfj (also referred to as "the motion along the input axis ktj"). The axis deviation between the input member INP and the shaft member SFT occurs from the contact area of the rotational member KTB contacting with the frictional member MSB as a base point (point O). The axis deviation is absorbed by inclination (sliding) of the first spherical surface member QM1 with respect to the second spherical surface member QM2, but the displacement of the first spherical surface member QM1 along the shaft axis sfj (input axis ktj), which is required to absorb the axis deviation, is minute. In other words, although the the first spherical surface member QM1 needs to be inclined to allow the axis deviation, the resultant axial movement thereof is minute. For this reason, the restraint member KSB allows such small axial movement Δd of the first spherical surface member QM1, which is necessary to absorb the axis deviation, but restricts more movement than necessary. That is, the restraint member KSB prevents the first spherical surface member QM1 from being inclined more than necessary, thereby restricting the position of the first spherical surface member QM1 such that the posture thereof in which the first spherical surface member QM1 contacts with the second spherical surface member QM2 is kept proper at all times.

A radiuses R of the convex and concave spherical surfaces KJM1, KJM2 of the first and second spherical surface members QM1, QM2 are set to be almost equal to a distance from the convex and concave spherical surfaces KJM1, KJM2 to the contact surface of the rotational member KTB that contacts with the frictional member MSB. That is, the radiuses R of the spherical surfaces determined such that the centers of the spherical surfaces KJM1, KJM2 are on the contact surface of the rotational member KTB that contacts with the frictional member MSB. The radiuses R of the spherical surfaces KJM1, KJM2 are equal with each other. The axis deviation (swinging motion of the rotational center axis) of the shaft member SFT occurs from the contact area of the rotational member KTB contacting with the frictional member MSB as the base point (point 0). The axis deviation can be effectively absorbed by properly determining the radiuses R of the convex and concave spherical surfaces KJM1, KJM2. Since size of each component element (ex. PSN) of the electric braking device BRK is known, the radiuses R of the spherical surfaces are determined based on the sizes thereof.

The pressing force acquisition device (for example, force sensor) FBA includes the strain detection element HZM, the calculation processing unit ENZ, and the lead wire LDS, and detects the pressing force of the pressing member PSN (reaction force of the pressing force) Fba. The strain detection element HZM is formed of a Wheatstone bridge circuit, and a pair of strain detection elements HZM are adhered to the flat surface HM2 on the opposite side to the spherical surface KJM2 of the second spherical surface member QM2 at interval of 180 degrees to detect the strain (displacement due to force) Hzm of the second spherical surface member QM2. As the strain detection elements HZM any type of strain detection element, for example, a strain detection element detecting a change of electric resistance (strain gauge) or supersonic waves can be used. The strains Hzm detected by the pair of strain detection elements HZM are transmitted to the calculation processing unit ENZ through the lead wire LDS. The calculation processing unit ENZ is a calculation circuit including a program, and calculates the pressing force Fba on the basis of an arithmetic mean value of the two strains Hzm transmitted from the pair of strain detection elements HZM and a previously set characteristic (calculation map such as a calibrated value). The pressing force Fba is transmitted to the electronic control unit ECU through a wire (wire harness) WRH to control the electric motor MTR.

In the electric braking device BRK including the rotation-linear motion converting mechanism HNK1 with the above-mentioned configuration, the output torque (rotating force) of the electric motor MTR is transmitted as the rotational motion of the shaft member SFT via the reduction gear GSK. The rotational motion of the shaft member SFT is converted into the linear motion (advancing and retreating motion relative to the rotational member KTB) of the pressing member PSN by the rotation-linear motion converting mechanism HNK1. Specifically, the portion of the shaft member SFT (nut-corresponding portion) MNJ on which the female thread portion (internal thread portion) is provided and the portion of the pressing member PSN (bolt-corresponding portion) ONJ on which the male thread (external thread) is provided are threadedly engaged with each other to convert rotation into linear motion. The pressing member PSN presses the frictional member MSB onto the rotational member KTB, generating the pressing force Fba to generate the braking force on the wheel WHL.

As explained above, in this embodiment, the second spherical surface member QM2 is fixed to the brake caliper CRP to restrain the rotational motion of the shaft member SFT with respect to the shaft axis sfj. The first spherical surface member QM1 that slidably contacts with the second spherical surface member QM2 is a different member from the rotating shaft member SFT and is separated therefrom. Accordingly, the first spherical surface member QM1 can freely rotate around the shaft axis sfj relative to the shaft member SET. Because the convex and concave spherical surfaces KJM1, KJM2 of the first and second spherical surface members QM1, QM2 are disposed on the same side as the electric motor MTR relative to the thread portion NJB, the motion in the pressing direction (direction in the shaft axis sfj) as well as the motion in the rotational direction (around the shaft axis sfj) are applied to the first spherical surface member QM1. However, since the shaft member SFT and the first spherical surface member QM1 are different separated members, even if the shaft member SFT is rotated, the first spherical surface member QM1 remains stationary or rotates only slightly. That is, even when axis deviation of the shaft member SFT occurs due to uneven wear of the MSB, and the shaft axis sfj is inclined relative to the input axis ktj (that is, axis deviation occurs), the first spherical surface member QM1 is not rotated around the shaft axis sfj, or rotated only slightly. As a result, repeated sliding movement caused by the rotation of the electric motor MTR is reduced, and a lack of grease is suppressed to maintain a suitable lubricating state. Further, a decrease in the efficiency of transmitting power caused by the sliding movement (sliding) can be suppressed. In addition, because the relative rotational motion of the first and second spherical surface members QM1, QM2 is prevented or suppressed, power loss of the electric motor MTR is reduced to ensure responsiveness to an increase in the braking torque at sudden braking.

The first spherical surface member QM1 abuts on the shaft member SFT via the bearing BGR interposed therebetween. Specifically, the bearing (for example, thrust bearing) BRG is provided between the flat surface SHM of the shaft member SFT (flat surface that is located on the opposite side to the pressing member PSN across the thread portion NJB and vertical to the shaft axis sfj) and the flat surface HM1 (back side of the convex spherical surface KJM1) of the first spherical surface member QM1. For this reason, the shaft member SFT smoothly rotates with respect to the first spherical surface member QM1 to keep the QM1 substantially stationary state. This can surely keep a suitable lubricating state and high efficiency of transmitting power from the electric motor MTR to the pressing member PSN.

The restraint member KSB fixed to the second spherical surface member QM2 restricts relative motion of the first spherical surface member QM1 to the second spherical surface member QM2 along the shaft axis sfj (lateral direction in the figure) (which may be referred to as "the motion along the input axis ktj). Specifically, the first spherical surface member QM1 is provided in the space (gap) formed between the second spherical surface member QM2 and the restraint member KSB. Thus, the restraint member KSB allows the movement of the first spherical surface member QM1 caused by the inclination thereof, which is necessary to absorb axis deviation, but restricts more movement thereof. Consequently, the posture of the first spherical surface member QM1 in which the first spherical surface member QM1 contacts with the second spherical surface member QM2 is kept proper and the first spherical surface member QM1 does not incline more than necessary to prevent impairment of the swinging function (oscillating function).

As an end surface of the first spherical surface member QM1 is formed into the convex spherical surface KJM1 and an end surface of the second spherical surface member QM2 is formed into the concave spherical surface KJM2, when the reaction force (that is, reaction of the pressing force Fba) is applied from the pressing member PSN to the first and second spherical surface members QM1, QM2, the radial component of the force acts toward the center (toward the input axis ktj) according to the relative inclination between the convex and concave spherical surfaces KJM1, KJM2 of the first and second spherical surface members QM1, QM2. Thus, the first spherical surface member QM1 moves such that the center axis thereof moves toward the input axis ktj. That is, because of such self-centering effect, the positional relation between the first spherical surface member QM1 and the second spherical surface member QM2 can be properly maintained.

The centers of the convex spherical surface KJM1 and the concave spherical surface KJM2 are set to be located on the contact surface of the rotational member KTB that contacts with the frictional member MSB. That is, on the input axis ktj, the radiuses R of the convex and concave spherical surfaces KJM1, KJM2 are set to be equal to the distance between the convex and concave spherical surfaces KJM1, KJM2 and the contact surface of the rotational member KTB that contacts with the frictional member MSB. Although the axis deviation (difference between the input axis ktj and the shaft axis sfj) of the shaft member SFT occurs from the contact area of the rotational member KTB contacting with the frictional member MSB as the base point (point O) due to, for example, uneven wear of the frictional member MSB, the centers of the convex and concave spherical surfaces KJM1, KJM2 of the first and second spherical surface members QM1, QM2 are located at the proper position (point O on the input axis ktj on the contact surface of the rotational member KTB that contacts with the frictional member MSB), and the axis deviation of the shaft member SFT can be effectively absorbed thereby.

The through hole KA1 is formed at the center of the first spherical surface member QM1 and the through hole KA2 is formed at the second spherical surface member QM2. The power (torque) is transmitted from the electric motor MTR to the shaft member SFT through the two through holes KA1, KA2. A counter shaft may be separately provided, and the rotational motion of the electric motor MTR may be transmitted to the shaft member SFT via the counter shaft. However, as compared to the configuration with the counter shft, the present embodiment can make the structure simpler to make the overall device compact.

Further, because the second spherical surface member QM2 has both the swinging allowance function of allowing the oscillating motion of the pressing member PSN and the function of detecting the pressing force Fba as the strain inducing body, the overall braking device can be made compact. The first spherical surface member QM1 is movable with respect to the second spherical surface member QM2, which allows the axis deviation of the shaft member SET. Because the second spherical surface member QM2 receives the reaction force of the pressing force Fba from the shaft member SFT (flat surface SHM) via the first spherical surface member QM1, the pressing force Fba is detected based on the strain of the second spherical surface member QM2. Further, the second spherical surface member QM2 is fixed to the brake caliper CPR, and does not rotate around the axis (shaft axis sfj, input axis ktj) which extends in the pressing direction of the pressing member PSN. Accordingly, the detection signal (strain Hzm) can be easily transmitted from the second spherical surface member QM2 without using a slip ring or the like.

Because the strain detection element HZM is provided on the flat surface HM2 of the second spherical surface member QM2 (on the opposite side to the spherical surface KJM2), pull-out and wiring of the detection signal wire (lead wire) LDS from the strain detection element (detection unit) HZM to the calculation processing unit (calculation circuit) ENZ can be facilitated. Further, pull-out and wiring of the wire WRH from the calculation processing unit ENZ to the electronic control unit ECU can be also facilitated.

By arranging the first spherical surface member QM1 in the gap (space) between the restraint member KSB and the second spherical surface member QM2, the relative motion of the first spherical surface member QM1 to the second spherical surface member QM2 along the shaft axis sfj (lateral direction in the figure) (which may be also referred to as "the motion along the input axis ktj) is restrained. In other words, the movement caused by the inclination of the QM1, which is necessary to absorb axis deviation, is allowed, but more movement is restricted. Thus, the first spherical surface member QM1 is pressed onto the second spherical surface member QM2 (strain inducing body) with the reaction force (reaction) of the pressing force Fba from the pressing member PSN, keeping the proper contacting posture. As a result, the axis of the first spherical surface member QM1 is not inclined relative to the axis of the second spherical surface member QM2 more than necessary, which achieves accurate detection of the pressing force Fba of the pressing member PSN.

As the end surface of the first spherical surface member QM1 is formed into the convex spherical surface KJM1, and the end surface of the second spherical surface member QM2 is formed into the concave spherical surface KJM2, when the reaction force (that is, reaction of the pressing force Fba) of the pressing member PSN is applied to the first and second spherical surface members QM1, QM2, radial component of the force acts toward the center (toward the input axis ktj) according to the relative inclination between the convex and concave spherical surfaces KJM1, KJM2 of the first and second spherical surface members QM1, QM2. Thus, the first spherical surface member QM1 is urged to move such that the center axis thereof moves toward the input axis ktj. That is, the positional relation between the first spherical surface member QM1 and the second spherical surface member QM2 is properly kept by the self-centering effect, which improves the detecting accuracy of the pressing force Fba of the pressing member PSN.

The centers of the convex spherical surface KJM1 and the concave spherical surface KJM2 are set to be located on the contact surface of the rotational member KTB that contacts with the frictional member MSB. That is, the radiuses R of the convex and concave spherical surfaces KJM1, KJM2 are set to be equal to the distance between the convex and concave spherical surfaces KJM1, KJM2 and the contact surface of the rotational member KTB contacting with the friction member MSB. Although the axis deviation (difference between the input axis ktj and the shaft axis sfj) of the shaft member SFT occurs from the contact area of the rotational member KTB contacting with the frictional member MSB as the base point (point O) due to, for example, uneven wear of the frictional member MSB, the centers of the convex and concave spherical surfaces KJM1, KJM2 of the first and second spherical surface members QM1, QM2 are located at the proper position (point O on the input axis ktj on the contact surface of the rotational member KTB contacting with the frictional member MSB), and thereby the axis deviation of the shaft member SFT is effectively absorbed, which improves the detecting accuracy of the pressing force Fba of the pressing member PSN.

The through hole KA1 is formed at the center of the first spherical surface member QM1, and the through hole KA2 is formed at the second spherical surface member QM2. The power (torque) is transmitted from the electric motor MTR to the shaft member SFT through the two through holes KA1, KA2. A counter shaft may be separately provided, and the rotational motion of the electric motor MTR may be transmitted to the shaft member SFT via the counter shaft. However, as compared to the configuration with the counter shaft, the present embodiment can make the structure simpler to make the overall device compact. Moreover, the stiffness of the second spherical surface member QM2 is lowered by the through hole KA2 formed at the center thereof, and thereby the strain is easily generated in the second spherical surface member QM2. Accordingly, the detecting resolution of the pressing force Fba of the pressing member PSN can be improved.

Figure 4:
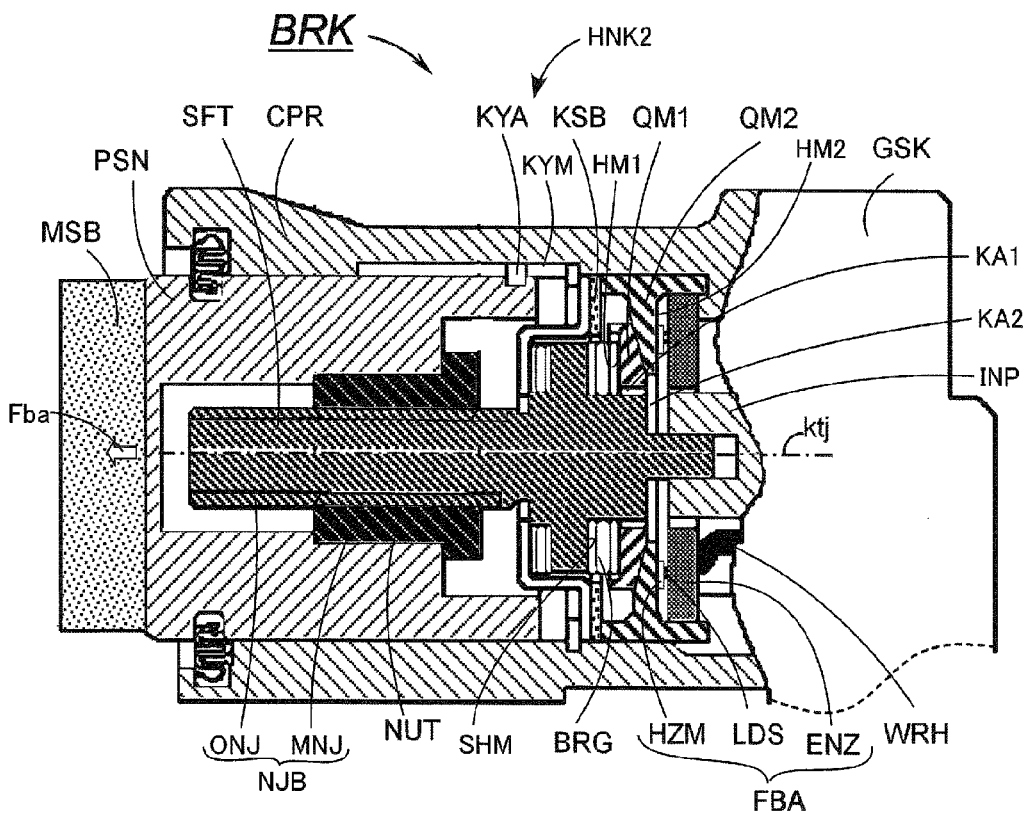
FIG. 4 is a partial sectional view illustrating a rotation-linear motion converting mechanism of an electric braking device in a second embodiment.
Figure 5A:
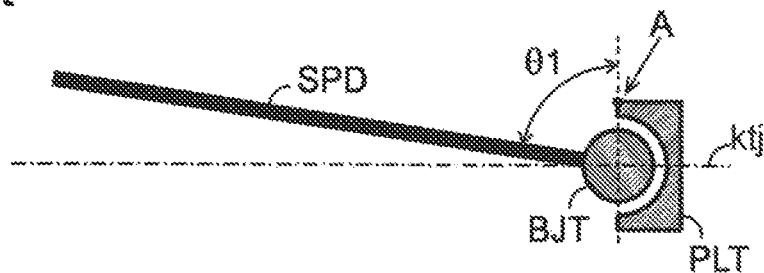
FIGS. 5(a) and 5(b) are views illustrating a problem of axis deviation of a shaft member due to uneven wear of a frictional member.
Figure 5B:
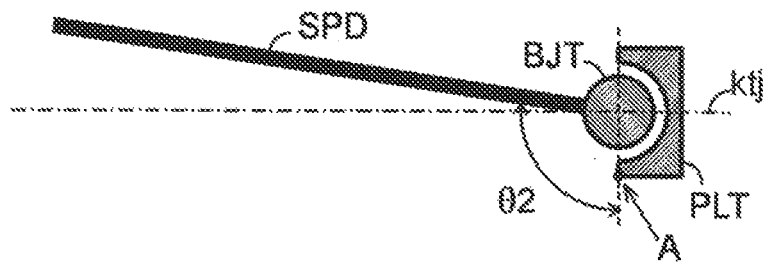

Second Embodiment of Rotation-Linear Motion Converting Mechanism HNK of Electric Braking Device BRK Second embodiment of the rotation-linear motion converting mechanism HNK of the electric braking device BRK will be explained below with reference to FIG. 4 corresponding to FIG. 2. The same function elements in FIG. 4 as those in FIG. 2 are given the same reference numerals, and detailed explanation thereof is omitted.

In the rotation-linear motion converting mechanism HNK1 in the first embodiment as shown in FIG. 2, the pressing member PSN is provided with the male thread portion ONJ, and the shaft member SFT is provided with the female thread portion MNJ. On the contrary, in the rotation-linear motion converting mechanism HNK2 in the second embodiment as shown in FIG. 4, a nut NUT fitted into the pressing member PSN is provided with the female thread portion (nut-corresponding portion) MNJ, and the shaft member SFT is provided with the male thread portion (bolt-corresponding portion) ONJ. The nut NUT is fixed to the pressing member PSN, and the shaft member SFT is rotated to cause the pressing member PSN to advance or retreat with respect to the rotational member KTB.

The holding member SPT provided in the rotation-linear motion converting mechanism HNK1 in the first embodiment is omitted in the rotation-linear motion converting mechanism HNK2 in the second embodiment, and the pressing force acquisition device FBA (especially, the calculation processing unit ENZ), the second spherical surface member QM2, and the restraint member KSB are directly fixed to the brake caliper CPR.

The electric braking device BRK provided with the rotation-linear motion converting mechanism HNK2 in the second embodiment achieves the same effect as that of the electric braking device BRK provided with the rotation-linear motion converting mechanism HNK1 in the first embodiment.

Although the sliding screw device such as the trapezoidal screw device is used as the thread portion NJB of the rotation-linear motion converting mechanism HNK in the embodiment, a rolling screw device such as a ball screw device may be adopted in place of the sliding screw device. In that case, the female thread portion MNJ is a "nut (with ball groove)", and the male thread portion is a "screw shaft (with ball groove)". Then, a plurality of balls is disposed in respective ball grooves to convert rotational motion into linear motion. In the case where the rolling screw device is used, the same effect can be achieved as described above.

Figure 6:
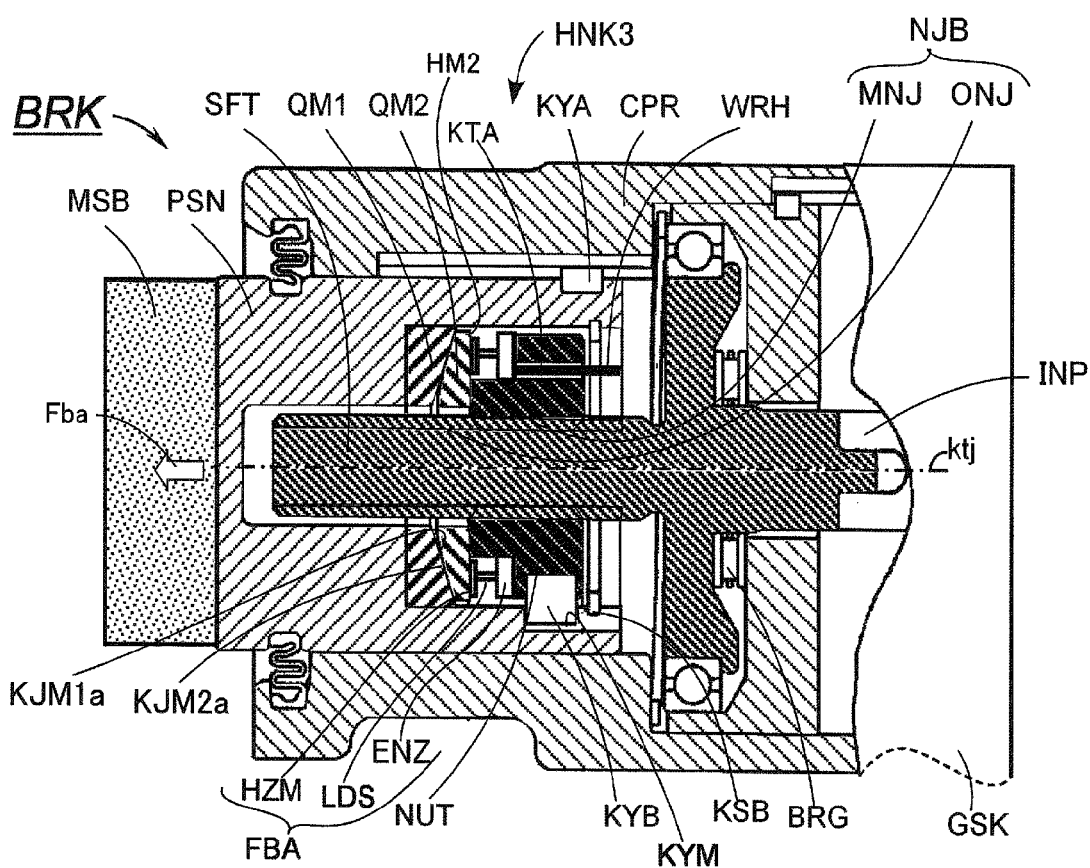
FIG. 6 is a partial sectional view of a rotation-linear motion converting mechanism of an electric braking device in a third embodiment.

Third Embodiment of Rotation-Linear Motion Converting Mechanism HNK of Electric Braking Device BRK Third embodiment of the rotation-linear motion converting mechanism HNK of the electric braking device BRK will be explained below with reference to FIG. 6 corresponding to FIG. 2 (or FIG. 4). The same function elements in FIG. 6 as those in FIG. 2 (or FIG. 4) are given the same reference numerals, and detailed explanation thereof is omitted.

In the rotation-linear motion converting mechanism HNK1, HNK2 in the first and second embodiments, the reaction force (reaction) of the pressing force Fba of the pressing member PSN is applied from the shaft member SFT to the first and second spherical surface members QM1, QM2. On the contrary, in the rotation-linear motion converting mechanism HNK3 in the third embodiment, the reaction force of the pressing force Fba of the pressing member PSN is applied from the pressing member PSN to the first and second spherical surface members QM1, QM2.

In the rotation-linear motion converting mechanism HNK1, HNK2 in the first and second embodiments, the convex spherical surface KJM1 is formed on the first spherical surface member QM1, and the concave spherical surface KJM2 is formed on the second spherical surface member QM2. On the contrary, in the rotation-linear motion converting mechanism HNK3 in the third embodiment, a concave spherical surface KJM1 is formed on the first spherical surface member QM1, and a convex spherical surface KJM2a is formed on the second spherical surface member QM2. The first spherical surface member QM1 is fixed to the pressing member PSN, and the second spherical surface member QM2 is fixed to the nut NUT having the female thread portion (nut-corresponding portion) MNJ. The nut NUT is threadedly engaged with the shaft SFT having the male thread portion (bolt-corresponding portion) ONJ at thread portion. The rotation of the pressing member PSN with respect to the brake caliper CPR is restrained by the key member KYA and the key groove. The rotation of the nut NUT with respect to the pressing member PSN is restrained by a key member KYB and a key groove KYM. Accordingly, the rotation of the nut NUT and the second spherical surface member QM2 with respect to the brake caliper CPR is restrained.

The convex spherical surface KJM2a of the second spherical surface member QM2 slides on the concave spherical surface KJM1a of the first spherical surface member QM1. The pressing force acquisition device FBA (especially, the calculation processing unit ENZ) is fixed to the nut NUT. The signal wire WRH is connected from the calculation processing unit ENZ of the pressing force acquisition device FBA to the electronic control unit ECU through a through hole KTA formed in the nut NUT. The pressing member PSN is provided with the restraint member (for example, snap ring) KSB to form space between the first spherical surface member QM1 and the restraint member KSB. The second spherical surface member QM2 and the nut NUT are arranged in this space (corresponding to the gap of the rotation-linear motion converting mechanism HNK1, HNK2). With this configuration, the motion of the QM2 along the shaft axis sfj (that is, input axis ktj) is restricted such that the second spherical surface member QM2 is not inclined relative to the first spherical surface member QM1 more than necessary.

The electric braking device BRK provided with the rotation-linear motion converting mechanism HNK3 in the third embodiment can achieve the same effect as that of the electric braking device BRK provided with the rotation-linear motion converting mechanisms HNK1, HNK2 in the first and second embodiments except for the effects of self-centering and optimization function by the radiuses R of the spherical surfaces.

Although the sliding screw device such as the trapezoidal screw device is used as the thread portion NJB of the rotation-linear motion converting mechanism HNK in the embodiment, a rolling screw device such as a ball screw device may be adopted in place of the sliding screw device. In that case, the female thread portion MNJ is a "nut (with ball grooves)", and the male thread portion is a "screw shaft (with ball grooves)". Then, a plurality of balls is disposed in respective ball grooves to convert rotational motion into linear motion. In the case where the rolling screw device is used, the same effect can be achieved as described above.

The invention claimed is:

1. An electric vehicle braking device that presses a brake pad serving as a frictional member onto a brake disk serving as a rotational member fixed to a wheel of a vehicle by means of an electric motor to generate a braking torque on the wheel, the electric vehicle braking device comprising:
    a pressing member that has a thread portion, which is either a nut-corresponding portion or a bolt-corresponding portion, and applies a pressing force to the brake pad;
    a shaft member that is rotated by the electric motor, and is threadedly engaged with the thread portion;
    a first spherical surface member that is separated from the shaft member and relatively rotatable around an axis of rotation of the shaft member with respect to the shaft member, and has a spherical surface,
    a second spherical surface member that has a spherical surface in sliding contact with the spherical surface of the first spherical surface member to receive a reaction force of the pressing force, and that is restrained from rotating around the axis of rotation of the shaft member, and
    a restraint member fixed to the second spherical surface member, which axially restricts movement of the first spherical surface member along the axis of the shaft member.

2. The electric vehicle braking device according to claim 1, wherein
    the shaft member abuts on the first spherical surface member via a bearing interposed therebetween.

3. The electric vehicle braking device according to claim 1, wherein
    the first spherical surface member has a convex spherical surface as the spherical surface, and
    the second spherical surface member has a concave spherical surface that is in sliding contact with the convex spherical surface.

4. The electric vehicle braking device according to claim 1, wherein
    the centers of curvature of the spherical surfaces of the first spherical member and the second spherical member are located on a contact surface between the brake disk and the brake pad.

5. The electric vehicle braking device according to claim 1, wherein
    the first spherical surface member and the second spherical surface member have respective through holes at the centers thereof, and power is transmitted from the electric motor to the shaft member through the through holes.

6. An electric vehicle braking device that presses a brake pad serving as a frictional member onto a brake disk serving as a rotational member fixed to a wheel of a vehicle by means of an electric motor to generate a braking torque on the wheel, the electric vehicle braking device comprising:

a pressing member that has a thread portion, which is either a nut-corresponding portion or a bolt-corresponding portion, and applies a pressing force to the brake pad;

a shaft member that is rotated by the electric motor, and is threadedly engaged with the thread portion;

a first spherical surface member that receives a reaction force of the pressing force from either the pressing member or the shaft member, and has a spherical surface;

a second spherical surface member that is restrained from being rotated around an axis of rotation of the shaft member, and that has a spherical surface in sliding contact with the spherical surface of the first spherical surface member to receive the reaction force of the pressing force from the first spherical surface member;

an acquisition device that detects a strain of the second spherical surface member to acquire the pressing force on the basis of the strain;

a control portion that controls the electric motor on the basis of the pressing force; and a restraint member fixed to the second spherical surface member, which axially restricts relative motion between the first spherical surface member and the second spherical surface member along the axis of the shaft member.

7. The electric vehicle braking device according to claim 6, further comprising an element for detecting the strain, which is adhered to the second spherical surface member on a side surface of the second spherical surface member opposite to the spherical surface of the second spherical surface member in the axial direction of the shaft member.

\* \* \* \* \*